March 7, 1933. C. F. LAMBERT 1,900,822
SPARE WHEEL AND TIRE COVER ASSEMBLY
Filed Oct. 27, 1932
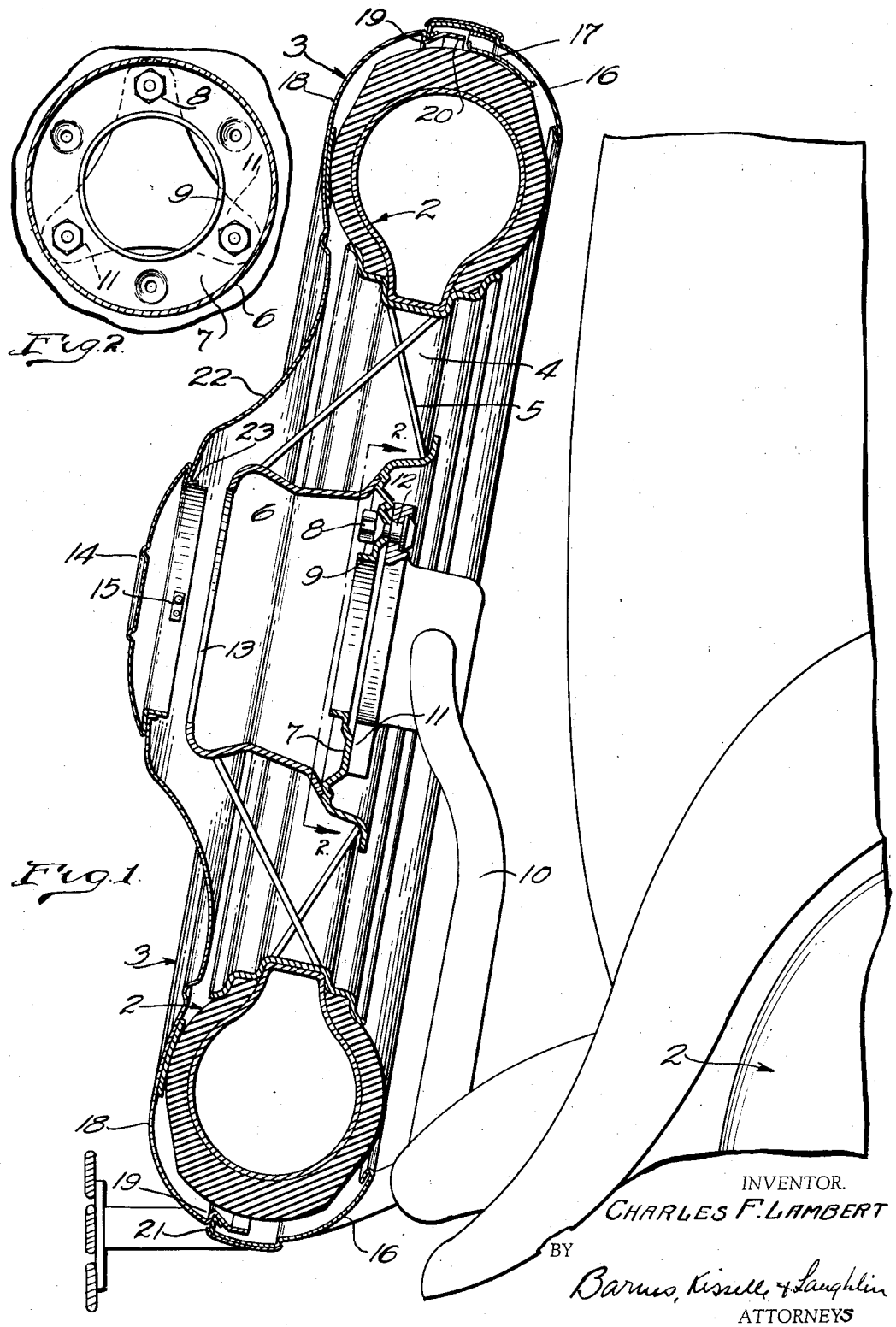
INVENTOR.
CHARLES F. LAMBERT
BY
Barnes, Kisselle & Laughlin
ATTORNEYS Patented Mar. 7, 1933

1,900,822

UNITED STATES PATENT OFFICE

CHARLES F. LAMBERT, OF GROSSE POINTE FARMS, MICHIGAN, ASSIGNOR TO CLAYTON AND LAMBERT MANUFACTURING COMPANY, OF DETROIT, MICHIGAN, A CORPORATION OF DELAWARE

SPARE WHEEL AND TIRE COVER ASSEMBLY

Application filed October 27, 1932. Serial No. 639,809.

This invention relates to a spare wheel and tire cover assembly, and has to do particularly with wheel assemblies of the type having hubs adapted to detachably receive hub caps, in combination with sheet metal tire covers of the general type disclosed in application Serial No. 563,366 of September 17, 1931, except that the cover is of the drum type.

Heretofore, in using drum type tire covers for rear mount spare tires, it has been necessary to remove the cover before removing the tire and wheel from the mounting bracket.

The present invention embodes particularly a wheel of the type having a central hollow hub portion adapted to be removably mounted on the axle spindle or to the brake housing or similar structure by a plurality of bolts. In other words, it has to do with that type of removable wheel now in standard use as contrasted with the detachable rim type. Wheels of this type are provided with removable hub caps whereby to permit access to the nuts to remove or assemble the wheel unit to the axle. It is a primary object of the present invention to provide a drum type tire cover having an aperture of the same size as the standard aperture in the wheel hub; the hub cap instead of being positioned within the wheel hub is positioned within the aperture in the tire cover. By mounting the standard hub cap in the face of the tire cover, instead of in the standard hub, makes it possible to more readily change the tire, makes for a much neater appearance of the tire cover, makes it possible to remove the entire assembly so that the cover can be removed on the ground instead of while on the car, or makes it possible to remove the cover without disturbing the spare hub cap.

In the drawing:

Fig. 1 is a transverse sectional view taken diametrically through a spare wheel and tire cover assembly embodying the present invention.

Fig. 2 is a sectional view taken on line 2—2 of Fig. 1.

In the embodiment of the invention shown, the tire and wheel may be generally designated 2, and the tire and wheel cover generally designated as at 3. The tire and wheel includes the usual rim 4, the spokes 5 and a hollow hub member 6.

The hub member 6 is provided with an inner wall 7 having a plurality of annularly spaced apertures for receiving the fastening means 8 which, as shown, consists of standard bolt and nut units. The wall 7 is preferably flanged as at 9 to provide a collar member adapted to fit around the axle spindle or flange (not shown).

A supporting standard 10 preferably mounted on the chassis frame is provided with flanges 11 having apertures 12 adapted to cooperate with three of the plurality of apertures in the wall 7. The hub 6 is provided with an aperture 13 which is of standard diameter to detachably receive a hub cap 14, said hub cap being preferably provided with a plurality of spring pressed retainer members 15 for holding the hub cap in place. Each wheel 2 on the car (not shown) is provided with a hub cap 14. It is obvious that in order to remove any wheel from the axle it is necessary to remove the hub cap in order to get at the nuts 8 to remove the wheel from the axle shaft.

The tire and wheel cover, generally designated 3, is preferably of the type disclosed in copending application No. 563,366 of September 17, 1931. The back part or half 16 of the cover is split whereby it may be circumferentially expanded and contracted. A plurality of spaced spring members 17 are positioned around the inner circumferential wall of the back half of the cover 16 so that when the cover is on the ground in expanded position the tire and wheel may be freely positioned within the springs and the back half of the cover. The front half 18 of the cover is circular in form and is preferably provided with a peripheral groove 19, so that after the tire is lowered into position within the back half 16 the front half 18 may be positioned so that the flange 20 extends within the back half cover and contacts with the springs 17. At this point the back half of the cover may be contracted so that the bead or flange 21 of the back half of the cover slides within the groove 19 to firmly hold the front half 18 in position. When the back half 16 is contracted the circumferentially spaced springs 17 contact with the tread of the tire to firmly hold the back half, as well as the entire tire cover, in position.

The front half 18 of the tire cover is of the drum type in that it is provided with a convex-concave front wall which terminates in an axially projecting portion 22. This portion 22 is provided with a flange or aperture 23 which is of exactly the same diameter as the aperture 13 in the hub 6 so that the spare hub cap 14, instead of being positioned in and carried by the hub 6 of the spare tire and wheel is normally positioned in and carried by the flange or aperture 23 of the tire and wheel cover.

In operation of the complete assembly, when it is desired to remove the spare wheel and tire from the standard 10, it is only necessary to remove the hub cap 14 in the customary manner after which a socket wrench may be inserted within the hub 6 and the nuts 8 removed to release the tire and wheel and tire and wheel cover. The entire assembly may then be laid on the ground, the back cover member 16 expanded, the front cover member 18 lifted out and the tire and wheel removed. In general, it is much easier to disassemble and assemble a tire cover, particularly of the type shown, on the ground than when on the car. The tire and wheel removed from the car which now becomes the spare tire, may then be directly dropped into the back cover on the ground, the front cover member 18 positioned in place, the back cover member contracted, the entire assembly again secured on the standard 10 and the hub cap snapped into place.

The alternate method of operation is to leave the hub cap in position on the front cover member 18 and expand the split back cover member 16. When so expanded the front cover member may be easily removed, and the bolts 8 removed from the flanges 11. The back cover member 16 may be removed with the entire assembly or may be allowed to drop behind the tire and back of the standard 10 until another tire is mounted in position as the spare tire.

In either method of assembly and disassembly, it is obvious that the hub cap always remains a part of the tire cover making it easier to remove the spare tire and wheel assembly or assemble the new spare tire and wheel assembly into place on the standard 10.

What I claim is:

1. A spare tire and wheel assembly comprising a supporting member, a wheel hub, fastening means at and back of the front opening of the hub for securing the tire and wheel assembly to the supporting member, said hub having an aperture for the insertion of a tool to engage the fastening means, said aperture being of predetermined shape and diameter to detachably receive a hub cap when the tire and wheel is positioned on the axle, a sheet metal tire cover detachably secured to the tire and having a drum portion enclosing the tire and wheel up to a point adjacent the hub, and an aperture in said drum portion of substantially the same size and shape as, and in alignment with, the aperture in said hub for receiving an auxiliary hub cap, said cap being removably held in said drum aperture.

2. A spare tire and wheel assembly comprising a supporting member, a hollow wheel hub, fastening means within the hub for securing the tire and wheel assembly to the supporting member, said hub having an aperture for the insertion of a tool to engage the fastening means, said aperture being of predetermined shape and diameter to detachably receive a hub cap when the tire and wheel is positioned on the axle, a sheet metal tire cover detachably secured to the tire and having a drum portion enclosing the tire and wheel up to a point adjacent the hub, and an aperture in said drum portion of substantially the same size and shape as, and in general alignment with, the aperture in said hub for receiving an auxiliary hub cap, said hub cap being removably held in said drum aperture and removable to permit insertion of the tool to release said fastening means and to permit removal of the complete tire cover spare tire and wheel assembly as a unit.

3. A spare tire and wheel assembly comprising a supporting member, a wheel hub having an aperture for detachably receiving a hub cap when in position on one of the axle spindles of the vehicle, fastening means at the hub for securing a portion of the hub directly to said supporting member, a metal tire cover detachably secured to the tire and having a front drum portion for covering the tire and wheel, an aperture formed in said drum portion of substantially the same size and shape and in general alignment with the hub aperture, and an auxiliary hub cap removably held in said drum aperture.

4. A spare tire and wheel assembly comprising a supporting member, a wheel hub having an aperture for detachably receiving a hub cap when in position on one of the axle spindles of the vehicle, fastening means at the hub for securing a portion of the hub directly to said supporting member, a metal tire cover detachably secured to the tire and having a front drum portion for covering the tire and wheel, an aperture formed in said drum portion in alignment with the aperture in said hub, and an auxiliary hub cap simulating said hub cap and removably held in said drum aperture.

5. A spare tire and wheel assembly including tire, rim, spokes and the hub all carried by a supporting member, fastening means at the hub for securing a portion of the hub directly to said supporting member, said hub being apertured to receive a hub cap when in use on the axle spindle, a tire cover including a back member and a front member detachably secured together at substantially the median plane of the tire, said front member concealing the wheel and being provided with an aperture in alignment with and substantially of the same size and shape as the aperture in the hub, and an auxiliary hub cap removably held in said drum aperture.

6. A spare tire and wheel assembly including tire, rim, spokes and the hub all carried by a supporting member, said hub being apertured to receive a hub cap when in use on the axle spindle, a tire cover including a back member and a front member detachably secured together at substantially the median plane of the tire, said front member concealing the wheel and being provided with an aperture substantially in axial alignment with and substantially of the same size and shape as the aperture in the hub for receiving an auxiliary hub cap, fastening means for securing a portion of said hub directly to said supporting member, said hub cap being removable to permit access to said fastening means.

7. A spare tire and wheel assembly including tire, rim, spokes and the hub all carried by a supporting member, fastening means at the hub for securing a portion of the hub directly to said supporting member, said hub being apertured to receive a hub cap when in use on the axle spindle, a tire cover including a back member and a front member detachably secured together at substantially the median plane of the tire, said front member concealing the wheel and being provided with an aperture in alignment with and substantially of the same size and shape as the aperture in the hub, an auxiliary hub cap removably held in said cover aperture, either said hub cap or said front cover member being removable to permit access to said fastening means.

8. A spare tire cover for use in connection with spare wheels including an apertured hub and fastening means accessible through the hub for fastening the spare wheel to the support on the vehicle, the said spare tire cover comprising a metallic sheathing arranged when in service to engage over the tire tread and having a front drum portion apertured at its center with an aperture in alignment with the aperture in the hub and of the same size and a removable hub cap for closing said aperture and which may be removed to give access to the fastening device to dismount the wheel and the tire cover from the support, the said hub cap arranged to interchangeably fit into said spare tire cover aperture and into the aperture of the hub so as to be usable interchangeably either on the cover or on a wheel hub when mounted on one of the axle spindles of the vehicle.

In testimony whereof I affix my signature.

CHARLES F. LAMBERT.